(12) United States Patent
Huh et al.

(10) Patent No.: US 12,525,202 B2
(45) Date of Patent: Jan. 13, 2026

(54) DISPLAY DEVICE AND METHOD OF DRIVING THE SAME

(71) Applicant: Samsung Display Co., LTD., Yongin-si (KR)

(72) Inventors: Su Jung Huh, Yongin-si (KR); Young Soo Hwang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 70 days.

(21) Appl. No.: 18/343,031

(22) Filed: Jun. 28, 2023

(65) Prior Publication Data

US 2024/0071329 A1 Feb. 29, 2024

(30) Foreign Application Priority Data

Aug. 24, 2022 (KR) .................. 10-2022-0106460

(51) Int. Cl.
*G09G 3/36* (2006.01)
*G02F 1/1333* (2006.01)
(Continued)

(52) U.S. Cl.
CPC ....... *G09G 3/3611* (2013.01); *G02F 1/13338* (2013.01); *G02F 1/134309* (2013.01); *G06F 3/0412* (2013.01); *G06F 3/04166* (2019.05); *G06F 3/0418* (2013.01); *G06F 3/0443* (2019.05); *G06F 3/0446* (2019.05); *H04N 13/359* (2018.05); *G09G 3/3233* (2013.01); *G09G 2300/0819* (2013.01); *G09G 2300/0842* (2013.01); *G09G 2300/0861* (2013.01); *G09G 2354/00* (2013.01)

(58) Field of Classification Search
None
See application file for complete search history.

(56) References Cited

U.S. PATENT DOCUMENTS 8,976,137 B2 3/2015 Goo et al.
10,649,231 B2 5/2020 An et al.
(Continued)

FOREIGN PATENT DOCUMENTS

CN 103293778 9/2013
CN 106886094 6/2017
(Continued)

*Primary Examiner* — Christopher R Lamb
(74) *Attorney, Agent, or Firm* — CANTOR COLBURN LLP

(57) ABSTRACT

A display device includes a display panel, a first electrode layer on the display panel, a liquid crystal layer on the first electrode layer, a second electrode layer on the liquid crystal layer, and a lens layer on the second electrode layer. The second electrode layer includes first sensors and second sensors forming a capacitance with each other, a first period includes a first frame period and a second frame period, a first voltage level of a first voltage applied to the first electrode layer during the first frame period is less than a second voltage level applied to the first electrode layer during the second frame period, and a first average voltage level of driving signals applied to the first sensors during the first frame period is less than a second average voltage level of the driving signals during the second frame period.

20 Claims, 13 Drawing Sheets

(51) Int. Cl.
*G02F 1/1343* (2006.01)
*G06F 3/041* (2006.01)
*G06F 3/044* (2006.01)
*G09G 3/3233* (2016.01)
*H04N 13/359* (2018.01)

(56) References Cited

U.S. PATENT DOCUMENTS

| | | | | |
|---|---|---|---|---|
| 2012/0242615 | A1* | 9/2012 | Teraguchi | G06F 3/04166 |
| | | | | 345/173 |
| 2014/0253490 | A1* | 9/2014 | Sumi | G06F 3/0445 |
| | | | | 345/174 |
| 2015/0177549 | A1* | 6/2015 | An | G02F 1/13338 |
| | | | | 349/12 |
| 2019/0384437 | A1* | 12/2019 | Kim | G06F 3/0412 |

FOREIGN PATENT DOCUMENTS

| | | |
|---|---|---|
| KR | 10-1706778 | 2/2017 |
| KR | 10-1721325 | 3/2017 |
| KR | 10-1953249 | 6/2019 |
| KR | 10-2111044 | 6/2020 |
| KR | 10-2021-0081786 | 7/2021 |
| WO | 2012011684 | 1/2012 |

\* cited by examiner

<3D MODE>

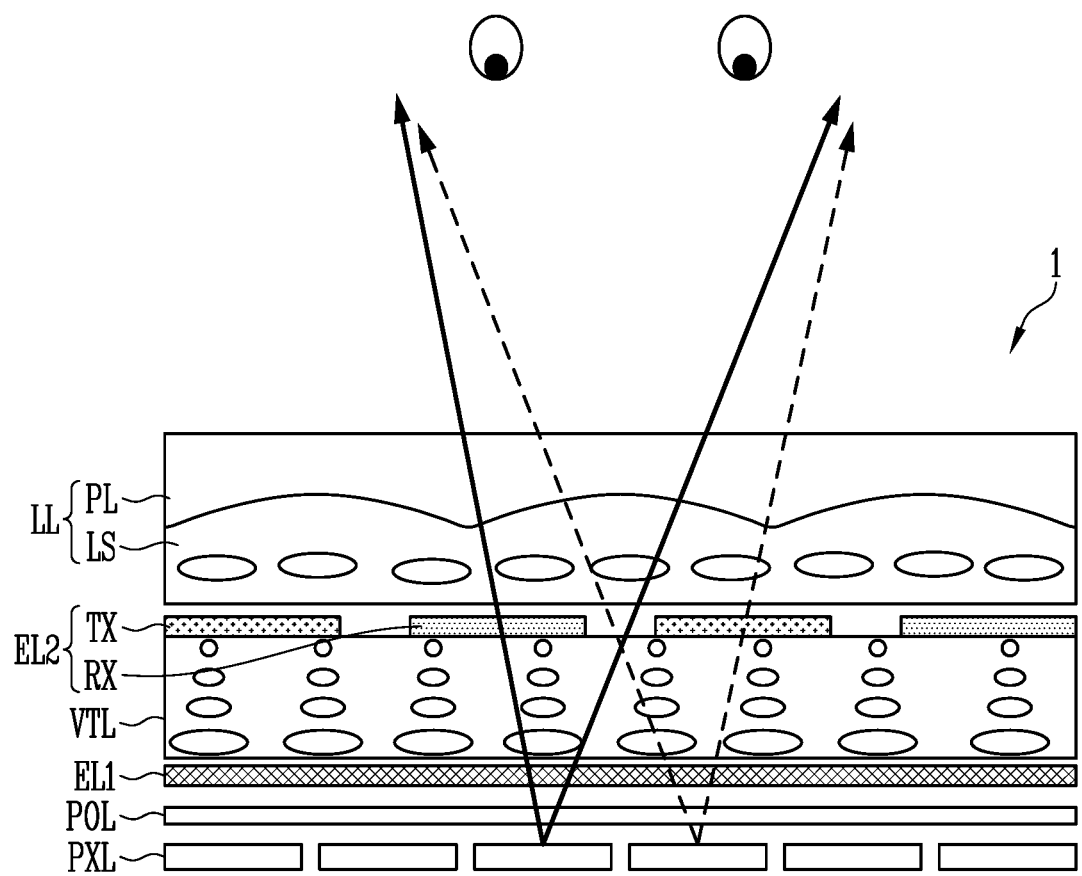

<3D MODE>

<2D MODE>

DISPLAY DEVICE AND METHOD OF DRIVING THE SAME

CROSS REFERENCE TO RELATED APPLICATION(S)

This application claims priority to and benefits of Korean Patent Application No. 10-2022-0106460 under 35 U.S.C. § 119, filed on Aug. 24, 2022, in the Korean Intellectual Property Office (KIPO), the entire contents of which are incorporated herein by reference.

BACKGROUND

1. Technical Field

The disclosure relates to a display device and a method of driving the same.

2. Description of the Related Art

As information technology develops, the importance of a display device, which is a connection medium between a user and information, has been highlighted. In response to this, a use of a display device such as a liquid crystal display device and an organic light emitting display device is increasing.

A stereoscopic image display device is a display device that provides a physical factor so that it is perceived as a stereoscopic image by stimulating a visual sense of a viewer identically to a real object. For example, the stereoscopic image display device may provide different images to a left eye and a right eye of the viewer so that the viewer may view the stereoscopic image by binocular parallax between the left eye and the right eye. The stereoscopic image display device may provide a multi-view image.

Recently, a display device capable of switching between a 3D mode for displaying a stereoscopic image and a 2D mode for displaying a 2D image is being developed.

SUMMARY

An object to be solved is to provide a display device and a method of driving the same capable of switching between a 3D mode and a 2D mode having a thin thickness and a reduced production cost.

An object to be solved is to provide a display device and a method of driving the same capable of minimizing interference of noise generated in a 3D mode with a touch driving signal.

According to an embodiment of the disclosure, a display device may include a display panel, a first electrode layer disposed on the display panel, a liquid crystal layer disposed on the first electrode layer, a second electrode layer disposed on the liquid crystal layer, and a lens layer disposed on the second electrode layer. The second electrode layer may include first sensors and second sensors forming a capacitance with the first sensors, a first period may include a first frame period and a second frame period after the first frame period, a first voltage level of a first voltage applied to the first electrode layer during the first frame period may be less than a second voltage level of the first voltage applied to the first electrode layer during the second frame period, and a first average voltage level of driving signals applied to the first sensors during the first frame period may be less than a second average voltage level of the driving signals applied to the first sensors during the second frame period.

The first period may further include a third frame period after the second frame period. The first voltage having the first voltage level may be applied to the first electrode layer during the third frame period, and the driving signals having the first average voltage level may be applied to the first sensors during the third frame period.

A second period after the first period may include a fourth frame period and a fifth frame period after the fourth frame period. The first voltage having a third voltage level may be applied to the first electrode layer during the fourth frame period and the fifth frame period, and the driving signals having a third average voltage level may be applied to the first sensors during the fourth frame period and the fifth frame period.

The third voltage level may be between the first voltage level and the second voltage level.

The third average voltage level may be between the first average voltage level and the second average voltage level.

The third voltage level and the third average voltage level may be same.

The first average voltage level may be greater than the first voltage level, and the second average voltage level may be less than the second voltage level.

An upper limit of the driving signals applied to the first sensors during the fourth frame period and the fifth frame period and a lower limit of the driving signals applied to the first sensors during the second frame period may be same.

A lower limit of the driving signals applied to the first sensors during the fourth frame period and the fifth frame period and an upper limit of the driving signals applied to the first sensors during the first frame period may be same.

During the first frame period, the driving signals alternating a high level and a low level may be sequentially applied to the first sensors, and a middle level of voltage between the high level and the low level may be applied to the first sensors to which the driving signals are not applied.

According to an embodiment of the disclosure, a method of driving a display device including a display panel, a first electrode layer, a liquid crystal layer, first sensors, second sensors forming a capacitance with the first sensors, and a lens layer may include applying a first voltage having a first voltage level to the first electrode layer during a first frame period, applying driving signals having a first average voltage level to the first sensors during the first frame period, applying the first voltage having a second voltage level greater than the first voltage level to the first electrode layer during a second frame period after the first frame period, and applying the driving signals having a second average voltage level greater than the first average voltage level to the first sensors during the second frame period.

The method may further include applying the first voltage having the first voltage level to the first electrode layer during a third frame period after the second frame period, and applying the driving signals having the first average voltage level to the first sensors during the third frame period.

The method may further include applying the first voltage having a third voltage level to the first electrode layer during a fourth frame period after the third frame period and a fifth frame period after the fourth frame period, and applying the driving signals having a third average voltage level to the first sensors during the fourth frame period and the fifth frame period.

The third voltage level may be between the first voltage level and the second voltage level.

The third average voltage level may be between the first average voltage level and the second average voltage level.

The third voltage level and the third average voltage level may be same.

The first average voltage level may be greater than the first voltage level, and the second average voltage level may be less than the second voltage level.

An upper limit of the driving signals applied to the first sensors during the fourth frame period and the fifth frame period and a lower limit of the driving signals applied to the first sensors during the second frame period may be same.

A lower limit of the driving signals applied to the first sensors during the fourth frame period and the fifth frame period and an upper limit of the driving signals applied to the first sensors during the first frame period may be same.

During the first frame period, the driving signals alternating a high level and a low level may be sequentially applied to the first sensors, and a middle level of voltage between the high level and the low level may be applied to the first sensors to which the driving signals are not applied.

The display device and the method of driving the same according to the disclosure may switch between a 3D mode and a 2D mode, have a thin thickness, and reduce a process cost.

The display device and the method of driving the same according to the disclosure may minimize interference of noise generated in a 3D mode with a touch driving signal.

BRIEF DESCRIPTION OF THE DRAWINGS

The above and other features of the disclosure will become more apparent by describing in further detail embodiments thereof with reference to the accompanying drawings, in which:

FIGS. 7, 8A, and 8B are schematic diagrams illustrating a display device capable of switching between a 3D mode and a 2D mode according to an embodiment of the disclosure;

DETAILED DESCRIPTION OF THE EMBODIMENT

Figure 1:
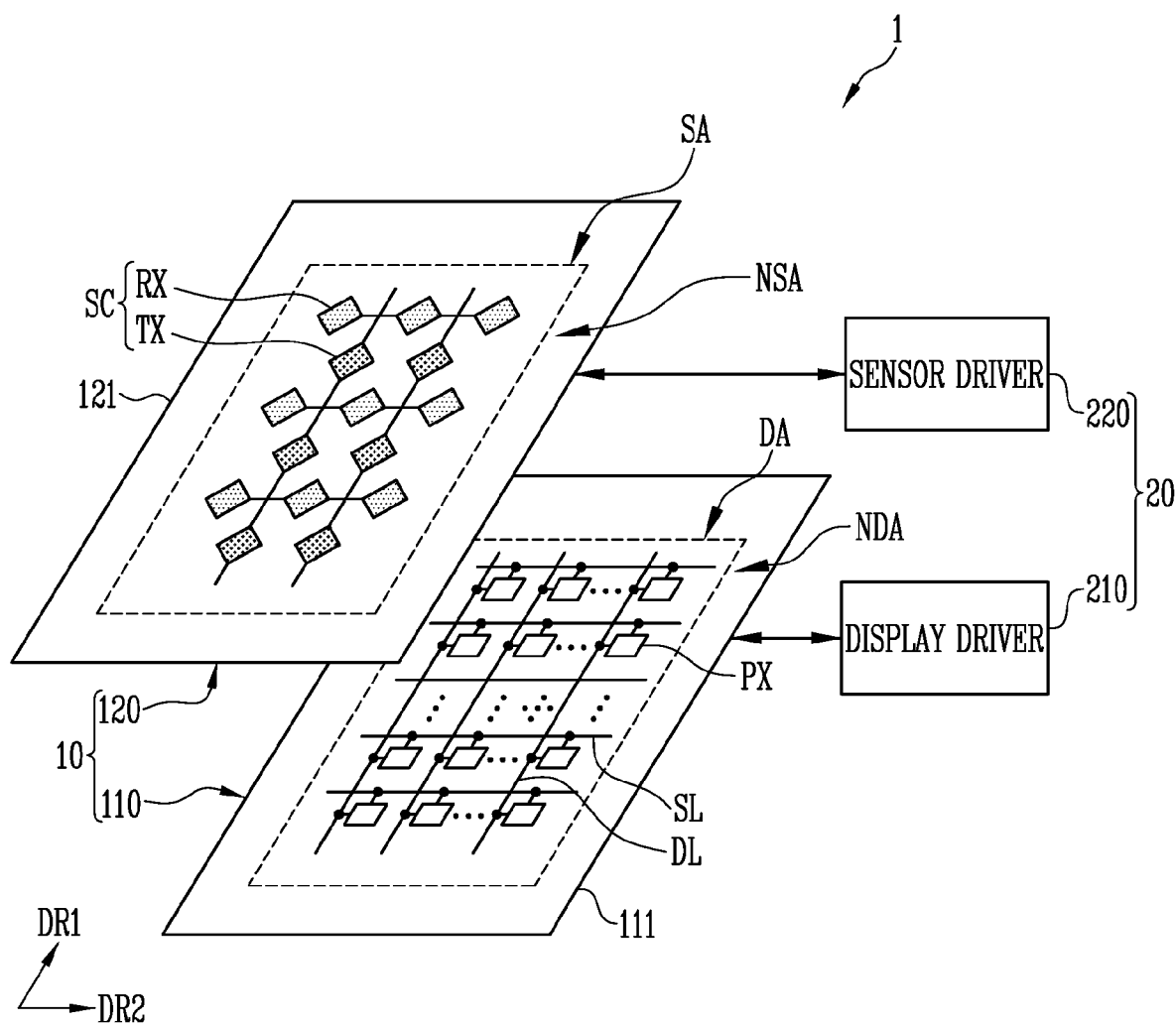
FIG. 1 is a schematic diagram illustrating a display device according to an embodiment of the disclosure.

Hereinafter, various embodiments of the disclosure will be described in detail with reference to the accompanying drawings so that those skilled in the art may carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". For example, the expression "is the same" may be the same enough for those of ordinary skill to understand that it is the same. Other expressions may also be expressions in which "substantially" is omitted.

In the specification and the claims, the phrase "at least one of" is intended to include the meaning of "at least one selected from the group of" for the purpose of its meaning and interpretation. For example, "at least one of A and B" may be understood to mean "A, B, or A and B." In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

When an element, such as a layer, is referred to as being "on", "connected to", or "coupled to" another element or layer, it may be directly on, connected to, or coupled to the other element or layer or intervening elements or layers may be present. When, however, an element or layer is referred to as being "directly on", "directly connected to", or "directly coupled to" another element or layer, there are no intervening elements or layers present. To this end, the term "connected" may refer to physical, electrical, and/or fluid connection, with or without intervening elements.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

FIG. 1 is a schematic diagram illustrating a display device according to an embodiment of the disclosure.

Referring to FIG. 1, the display device 1 according to an embodiment of the disclosure may include a panel 10 and a driving circuit 20 for driving the panel 10.

For example, the panel 10 may include a display part 110 for displaying an image and a sensor part 120 for sensing touch, pressure, fingerprint, hovering, or the like. For example, the panel 10 may include pixels PX and sensors SC positioned to overlap at least a portion of the pixels PX. In an embodiment, the sensors SC may include first sensors TX and second sensors RX. In another embodiment (for example, in a self-capacitance method), the sensors SC may be configured as one type of sensors without distinction between the first sensor and the second sensor. The driving circuit 20 may include a display driver 210 for driving the display part 110 and a sensor driver 220 for driving the sensor part 120. For example, the pixels PX may display an image in a unit display frame period. For example, the sensors SC may sense an input of a user in a unit sensing frame period. A sensing frame period and a display frame period may be independent of each other and may be different from each other. The sensing frame period and the display frame period may be synchronized with each other or may be asynchronous.

According to an embodiment, the display part 110 and the sensor part 120 may be separately manufactured, and disposed and/or combined so that at least an area overlaps each other. In another embodiment, the display part 110 and the sensor part 120 may be integrally manufactured. For example, the sensor part 120 may be directly formed on at least one substrate configuring the display part 110 (for example, an upper substrate and/or a lower substrate of the display panel, or a thin film encapsulation layer), or other insulating layers or various functional layer (for example, an optical layer or a protective layer).

In FIG. 1, the sensor part 120 is disposed on a front surface (for example, an upper surface on which an image is displayed) of the display part 110, but a position of the sensor part 120 is not limited thereto. For example, in another embodiment, the sensor part 120 may be disposed on a back surface or both surfaces of the display part 110. In still another embodiment, the sensor part 120 may be disposed on at least one edge area of the display part 110.

The display part 110 may include a display substrate 111 and multiple pixels PX formed on the display substrate 111. The pixels PX may be disposed in a display area DA of the display substrate 111.

The display substrate 111 may include a display area DA where an image is displayed and a non-display area NDA disposed adjacent to the display area DA. According to an embodiment, the display area DA may be disposed in a center area of the display part 110, and the non-display area NDA may be disposed in an edge area of the display part 110 to surround the display area DA.

The display substrate 111 may be a rigid substrate or a flexible substrate, but a material or a physical property thereof is not particularly limited. For example, the display substrate 111 may be a rigid substrate formed of glass or tempered glass, or a flexible substrate formed of a thin film of a plastic or a metal.

Scan lines SL and data lines DL, and pixels PX connected to the scan lines SL and the data lines DL may be disposed in the display area DA. The pixels PX may be selected by a scan signal of a turn-on level supplied from the scan lines SL, may receive a data signal from the data lines DL, and may emit light of a luminance corresponding to the data signal. Therefore, an image corresponding to the data signal may be displayed in the display area DA. In the disclosure, a structure, a driving method, and the like of the pixels PX are not particularly limited. For example, each of the pixels PX may be implemented as a pixel employing various structures and driving methods.

In the non-display area NDA, various lines and/or a built-in circuit connected to the pixels PX of the display area DA may be disposed. For example, multiple lines for supplying various power and control signals to the display area DA may be disposed in the non-display area NDA, and a scan driver or the like may be disposed in the non-display area NDA.

In the disclosure, a type of the display part 110 is not particularly limited. For example, the display part 110 may be implemented as a self-emission type display panel such as an organic light emitting display panel. However, in case that the display part 110 is implemented as a self-emission type, each pixel is not limited to a case where only an organic light emitting element is included. For example, a light emitting element of each pixel may be configured of an organic light emitting diode, an inorganic light emitting diode, a quantum dot/well light emitting diode, or the like. Multiple light emitting elements may be provided in each pixel. The light emitting elements may be connected in series, parallel, series-parallel, or the like. In another embodiment, the display part 110 may be implemented as a non-emission type display panel such as a liquid crystal display panel. In case that the display part 110 is implemented as a non-emission type, the display device 1 may include a light source such as a light emitting device.

The sensor part 120 may include a sensor substrate 121 and multiple sensors SC formed on the sensor substrate 121. The sensors SC may be disposed in a sensing area SA on the sensor substrate 121.

The sensor substrate 121 may include a sensing area SA in which a touch input or the like may be sensed, and a peripheral area NSA disposed adjacent to the sensing area SA. According to an embodiment, the sensing area SA may be disposed to overlap at least an area of the display area DA. For example, the sensing area SA may be an area corresponding to the display area DA (for example, an area overlapping the display area DA), and the peripheral area NSA may be an area corresponding to the non-display area NDA (for example, an area overlapping the non-display area NDA). In case that a touch input or the like is provided on the display area DA, the touch input may be detected by the sensor part 120.

The sensor substrate 121 may be a rigid or flexible substrate, and may include at least one insulating layer. The sensor substrate 121 may be a transparent or translucent light-transmitting substrate, but is not limited thereto. In the disclosure, a material and a physical property of the sensor substrate 121 are not particularly limited. For example, the sensor substrate 121 may be a rigid substrate formed of glass or tempered glass, or a flexible substrate formed of a thin film of a plastic or a metal. According to an embodiment, at least one substrate (for example, the display substrate 111, an encapsulation substrate and/or a thin film encapsulation layer) configuring the display part 110, at least one insulating layer, functional layer, or the like disposed in an inside and/or on an outer surface of the display part 110 may be used as the sensor substrate 121.

The sensing area SA may be an area capable of responding to the touch input (for example, an active area of a sensor). The sensors SC for sensing the touch input or the like may be disposed in the sensing area SA. According to an embodiment, the sensors SC may include the first sensors TX and the second sensors RX.

For example, each of the first sensors TX may extend in a first direction DR1. The first sensors TX may be arranged in a second direction DR2. The second direction DR2 may be different from the first direction DR1. For example, the second direction DR2 may be a direction orthogonal to the first direction DR1. In another embodiment, an extension direction and an arrangement direction of the first sensors TX may follow another conventional configuration. Each of the first sensors TX may have a form in which first cells of a relatively large area and first bridges of a relatively narrow area are connected each other. In FIG. 1, each of the first cells is shown in a diamond shape, but each of the first cells may be configured in various conventional shapes such as a circle, a quadrangle, a triangle, and a mesh form. For example, the first bridges and the first cells may be integrally formed on the same layer. In another embodiment, the first bridges may be formed on a layer different from that of the first cells and may electrically connect adjacent first cells.

For example, each of the second sensors RX may extend in the second direction DR2. The second sensors RX may be arranged in the first direction DR1. In another embodiment, an extension direction and an arrangement direction of the second sensors RX may follow another conventional configuration. Each of the second sensors RX may have a form in which second cells of a relatively large area and second bridges of a relatively narrow area connected each other. In FIG. 1, each of the second cells is shown in a diamond shape, but each of the second cells may be configured in various conventional shapes such as a circle, a quadrangle, a triangle, and a mesh form. For example, the second bridges and the second cells may be integrally formed on the same layer. In another embodiment, the second bridges may be formed in a layer different from that of the second cells and may electrically connect adjacent second cells.

According to an embodiment, each of the first sensors TX and the second sensors RX may have conductivity by including at least one of a metal, a transparent conductive material, and various other conductive materials. For example, the first sensors TX and the second sensors RX may include a metal such as gold (Au), silver (Ag), aluminum (Al), molybdenum (Mo), chromium (Cr), titanium (Ti), nickel (Ni), neodymium (Nd), copper (Cu), and platinum (Pt), or an alloy thereof. The first sensors TX and the second sensors RX may be configured in a mesh form. The first sensors TX and the second sensors RX may include at least one transparent conductive material such as silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nano tube, graphene, and the like. The first sensors TX and the second sensors RX may have conductivity by including at least one conductive material. Each of the first sensors TX and the second sensors RX may be formed of a single layer or multiple layers, and a cross-sectional structure thereof is not particularly limited.

The sensor lines for electrically connecting the sensors TX and RX to the sensor driver 220 and the like may be intensively disposed in the peripheral area NSA of the sensor part 120.

The driving circuit 20 may include the display driver 210 for driving the display part 110 and the sensor driver 220 for driving the sensor part 120. In an embodiment, the display driver 210 and the sensor driver 220 may be configured of integrated chips (ICs) separated from each other. In another embodiment, at least a portion of the display driver 210 and at least a portion of the sensor driver 220 may be integrated together in one IC.

The display driver 210 may be electrically connected to the display part 110 to drive the pixels PX. For example, the display driver 210 may include a data driver and a timing controller, and the scan driver may be separately mounted in the non-display area NDA of the display part 110. In another embodiment, the display driver 210 may include all or at least a portion of the data driver, the timing controller, and the scan driver.

The sensor driver 220 may be electrically connected to the sensor part 120 to drive the sensors SC. The sensor driver 220 may include a sensor transmitter and a sensor receiver. According to an embodiment, the sensor transmitter and the sensor receiver may be integrated into one IC, but the disclosure is not limited thereto.

Figure 2:
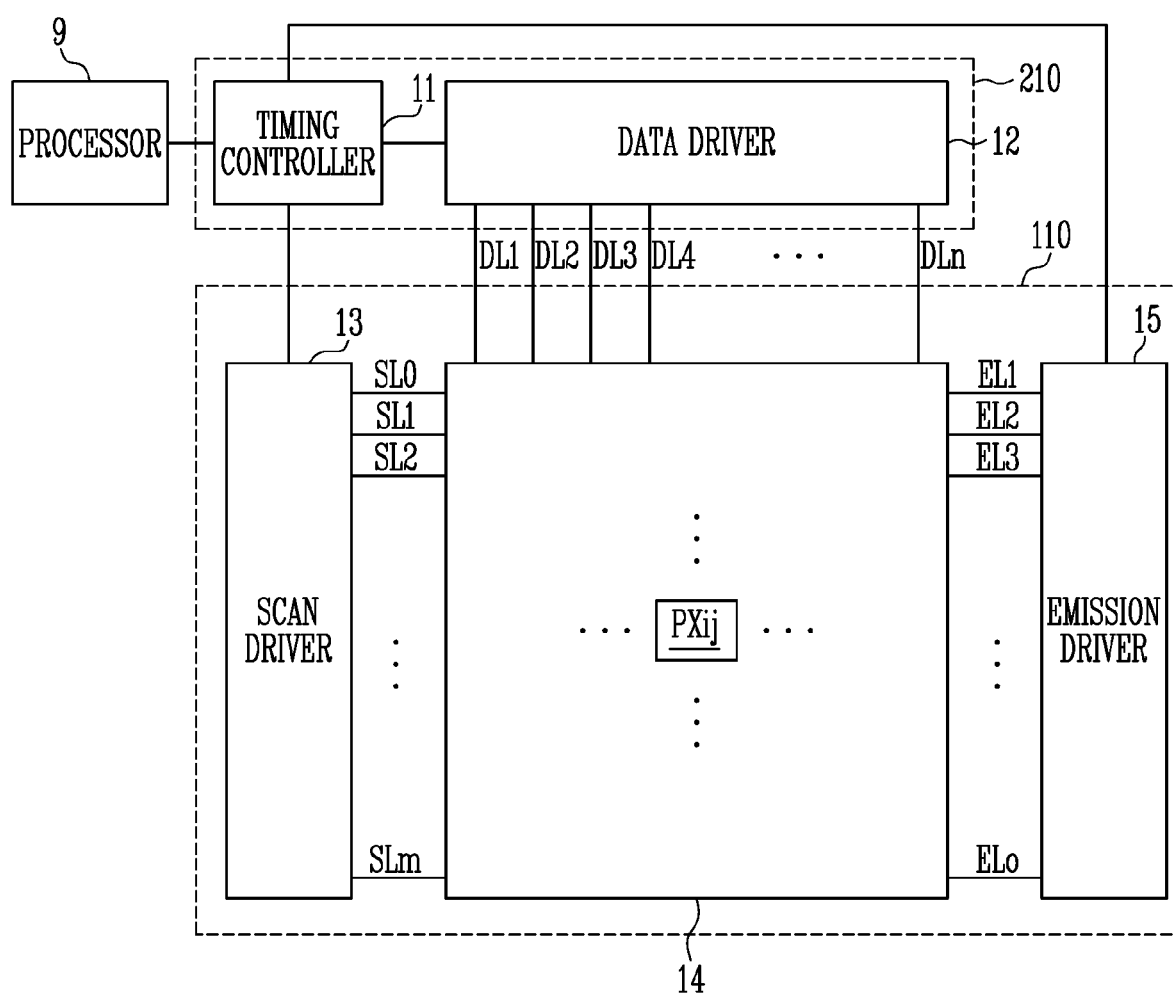
FIG. 2 is a schematic diagram illustrating a display part and a display driver according to an embodiment of the disclosure.
Figure 3:
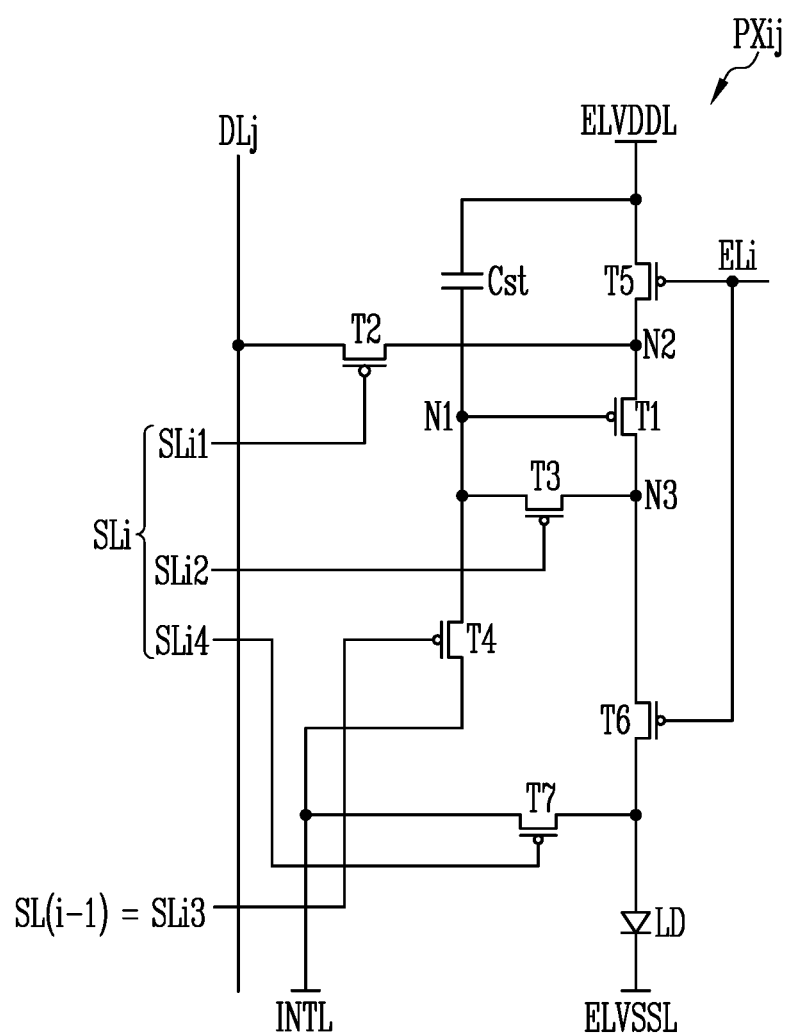
FIG. 3 is a schematic diagram illustrating a pixel according to an embodiment of the disclosure.
Figure 4:
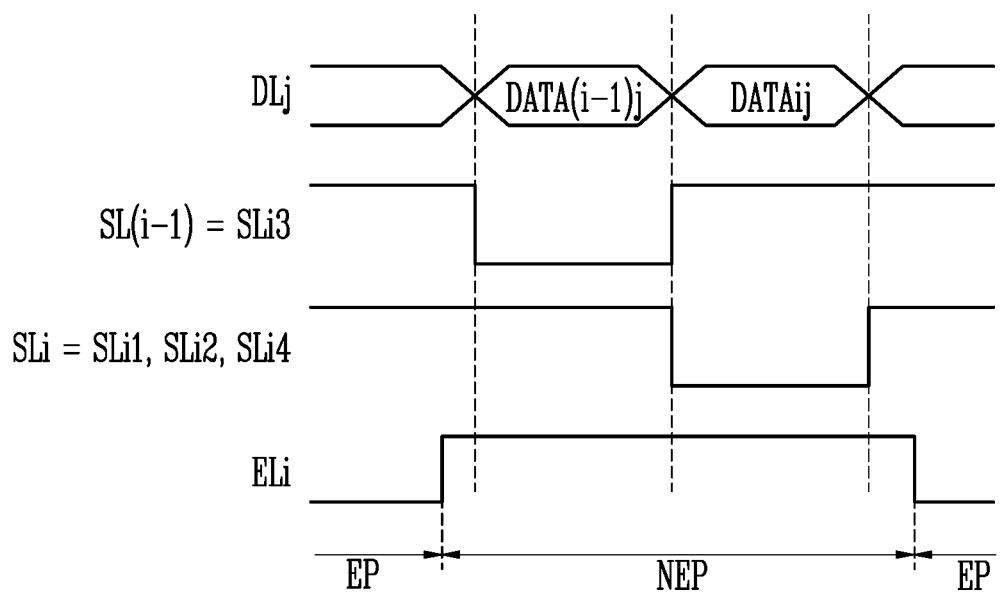
FIG. 4 is a schematic diagram illustrating a method of driving the pixel of FIG. 3.

FIG. 2 is a schematic diagram illustrating a display part and a display driver according to an embodiment of the disclosure. FIG. 3 is a schematic diagram illustrating a pixel according to an embodiment of the disclosure. FIG. 4 is a schematic diagram illustrating a method of driving the pixel of FIG. 3.

Referring to FIG. 2, the display driver 210 may include a timing controller 11 and a data driver 12, and the display part 110 may include a scan driver 13, a pixel part 14, and an emission driver 15. As described above, whether each functional unit is integrated into one IC, integrated into multiple ICs, or mounted on the display substrate 111 may be variously configured according to a specification of the display device 1.

The timing controller 11 may receive grayscales and timing signals for each frame period from a processor 9. The processor may correspond to at least one of a graphics processing unit (GPU), a central processing unit (CPU), an application processor (AP), and the like. The timing signals may include a vertical synchronization signal, a horizontal synchronization signal, a data enable signal, and the like.

Each cycle of the vertical synchronization signal may correspond to each frame period. Each cycle of the horizontal synchronization signal may correspond to each horizontal period. The grayscales may be supplied in a horizontal line unit in each horizontal period in response to a pulse of an enable level of the data enable signal. A horizontal line may mean pixels (for example, a pixel row) connected to the same scan line and emission line.

The timing controller 11 may render the grayscales to correspond to the specification of the display device 1. For example, the processor 9 may provide a red grayscale, a green grayscale, and a blue grayscale to each unit dot. For example, in case that the pixel part 14 has an RGB stripe structure, the pixels may correspond to each grayscale one-to-one, and rendering of the grayscales may not be required. However, for example, in case that the pixel part 14 has a PENTILE™ structure, since the pixel is shared by adjacent unit dots, the pixels may not correspond to each grayscale one-to-one, and rendering of the grayscales may be required. The rendered or non-rendered grayscales may be provided to the data driver 12. The timing controller 11 may provide a data control signal to the data driver 12. The timing controller 11 may provide a scan control signal to the scan driver 13 and may provide an emission control signal to the emission driver 15.

The data driver 12 may generate data voltages (for example, data signals DLn) to be provided to data lines DL1, DL2, DL3, DL4, . . . , and DLn using the grayscales and the data control signal received from the timing controller 11. n may be an integer greater than 0.

The scan driver 13 may generate scan signals to be provided to scan lines SL0, SL1, SL2, . . . , and SLm using the scan control signal (for example, a clock signal, a scan start signal, and the like) received from the timing controller 11. The scan driver 13 may sequentially supply scan signals having a pulse of a turn-on level to the scan lines SL0 to SLm. The scan driver 13 may include scan stages configured in a form of a shift register. The scan driver 13 may generate the scan signals in a method of sequentially transferring the scan start signal that is a pulse form of a turn-on level to a next scan stage according to control of the clock signal. m may be an integer greater than 0.

The emission driver 15 may generate emission signals to be provided to emission lines EL1, EL2, EL3, . . . , and ELo using the emission control signal (for example, a clock signal, an emission stop signal, and the like) received from the timing controller 11. The emission driver 15 may sequentially supply emission signals having a pulse of a turn-off level to the emission lines EL1 to ELo. The emission driver 15 may include emission stages configured in a form of a shift register. The emission driver 15 may generate the emission signals in a method of sequentially transferring the emission stop signal that is a pulse form of a turn-off level to a next emission stage according to control of the clock signal. o may be an integer greater than 0.

The pixel part 14 may include the pixels. Each pixel PXij may be connected to corresponding data line, scan line, and emission line. The pixels may include pixels emitting light of a first color, pixels emitting light of a second color, and pixels emitting light of a third color. The first color, the second color, and the third color may be different colors. For example, the first color may be one of red, green, and blue, the second color may be one of red, green, and blue other than the first color, and the third color may be one of red, green, and blue other than the first color and the second color. Magenta, cyan, and yellow may be used instead of red, green, and blue as the first to third colors.

FIG. 3 is a schematic diagram illustrating a pixel according to an embodiment of the disclosure.

Referring to FIG. 3, the pixel PXij may include transistors T1, T2, T3, T4, T5, T6, and T7, a storage capacitor Cst, and a light emitting element LD.

Hereinafter, a circuit configured of a P-type transistor is described as an example. However, those skilled in the art will be able to design a circuit configured of an N-type transistor by differentiating a polarity of a voltage applied to a gate terminal. Similarly, those skilled in the art will be able to design a circuit configured of a combination of a P-type transistor and an N-type transistor. The P-type transistor may be a transistor in which a current amount increases in case that a voltage difference between a gate electrode and a source electrode increases in a negative direction. The N-type transistor may be a transistor in which a current amount increases in case that a voltage difference between a gate electrode and a source electrode increases in a positive direction. The transistor may be configured in various forms such as a thin film transistor (TFT), a field effect transistor (FET), and a bipolar junction transistor (BJT).

The first transistor T1 may have a gate electrode connected to a first node N1, a first electrode connected to a second node N2, and a second electrode connected to a third node N3. The first transistor T1 may be a driving transistor.

The second transistor T2 may have a gate electrode connected to a scan line SLi1, a first electrode connected to a data line DLj, and a second electrode connected to the second node N2. The second transistor T2 may be a scan transistor.

The third transistor T3 may have a gate electrode connected to a scan line SLi2, a first electrode connected to the first node N1, and a second electrode connected to the third node N3. The third transistor T3 may be a diode connection transistor.

The fourth transistor T4 may have a gate electrode connected to a scan line SLi3, a first electrode connected to the first node N1, and a second electrode connected to an initialization line INTL. The fourth transistor T4 may be a gate initialization transistor.

The fifth transistor T5 may have a gate electrode connected to an i-th emission line ELi, a first electrode connected to a first power line ELVDDL, and a second electrode connected to the second node N2. The fifth transistor T5 may be an emission transistor. In another embodiment, the gate electrode of the fifth transistor T5 may be connected to an emission line different from an emission line connected to a gate electrode of the sixth transistor T6.

The sixth transistor T6 may have a gate electrode connected to the i-th emission line ELi, a first electrode connected to the third node N3, and a second electrode connected to an anode of the light emitting element LD. The sixth transistor T6 may be an emission transistor. In another embodiment, the gate electrode of the sixth transistor T6 may be connected to an emission line different from the emission line connected to the gate electrode of the fifth transistor T5.

The seventh transistor T7 may have a gate electrode connected to a scan line SLi4, a first electrode connected to the initialization line INTL, and a second electrode connected to the anode of the light emitting element LD. The seventh transistor T7 may be a light emitting element initialization transistor.

A first electrode of the storage capacitor Cst may be connected to the first power line ELVDDL and a second electrode may be connected to the first node N1.

The anode of the light emitting element LD may be connected to the second electrode of the sixth transistor T6 and a cathode may be connected to a second power line ELVSSL. The light emitting element LD may be a light emitting diode. The light emitting element LD may be configured of an organic light emitting element (organic light emitting diode), an inorganic light emitting element (inorganic light emitting diode), a quantum dot/well light emitting element (quantum dot/well light emitting diode), or the like. The light emitting element LD may emit light of the first color, the second color, or the third color. Although only one light emitting element LD is provided in each pixel in the embodiment, multiple light emitting elements may be provided in each pixel in another embodiment. The light emitting elements may be connected in series, parallel, series-parallel, or the like.

The first power line ELVDDL may be supplied with a first power voltage, the second power line ELVSSL may be supplied with a second power voltage, and the initialization line INTL may be supplied with an initialization voltage. For example, the first power voltage may be greater than the second power voltage. For example, the initialization voltage may be equal to or greater than the second power voltage. For example, the initialization voltage may correspond to a data voltage of the smallest size among data voltages that may be provided. In another embodiment, the size of the initialization voltage may be less than sizes of the data voltages that may be provided.

FIG. 4 is a schematic diagram illustrating a method of driving the pixel of FIG. 3.

Hereinafter, for convenience of description, it is assumed that the scan lines SLi1, SLi2, and SLi4 are i-th scan lines SLi and the scan line SLi3 is an (i−1)-th scan line SL(i−1). However, a connection relationship of the scan lines SLi1, SLi2, SLi3, and SLi4 may be various according to embodiments. For example, the scan line SLi4 may be the (i−1)-th scan line or an (i+1)-th scan line.

First, an emission signal of a turn-off level (logic high level) may be applied to the i-th emission line ELi, a data voltage DATA(i−1)j for an (i−1)-th pixel may be applied to the data line DLj, and a scan signal of a turn-on level (logic low level) may be applied to the scan line SLi3. The high/low of the logic level may vary according to whether a transistor is a P-type or an N-type.

Since a scan signal of a turn-off level is applied to the scan lines SLi1 and SLi2, the second transistor T2 is turned off and the data voltage DATA(i−1)j may be prevented from being input to the pixel PXij.

Since the fourth transistor T4 is turned on, the first node N1 may be connected to the initialization line INTL, and a voltage of the first node N1 may be initialized. Since the emission signal of the turn-off level is applied to the emission line EL1, the transistors T5 and T6 may be turned off, and light emission of an unnecessary light emitting element LD according to an initialization voltage application process may be prevented.

A data voltage DATAij for the i-th pixel PXij may be applied to the data line DLj, and the scan signal of the turn-on level may be applied to the scan lines SLi1 and SLi2. Accordingly, the transistors T2, T1, and T3 may be turned on, and the data line DLj and the first node N1 may be electrically connected with each other. Therefore, a compensation voltage obtained by subtracting a threshold voltage of the first transistor T1 from the data voltage DATAij may be applied to the second electrode of the storage capacitor Cst (for example, the first node N1), and the storage capacitor Cst may maintain a voltage corresponding to a difference between the first power voltage and the compensation voltage. Such a period may be referred to as a threshold voltage compensation period or a data writing period.

In case that the scan line SLi4 is the i-th scan line, since the seventh transistor T7 is turned on, the anode of the light emitting element LD and the initialization line INTL may be connected with each other, and the light emitting element LD may be initialized to a charge amount corresponding to a voltage difference between the initialization voltage and the second power voltage.

Thereafter, as the emission signal of the turn-on level is applied to the i-th emission line ELi, the transistors T5 and T6 may be turned on. Therefore, a driving current path connecting the first power line ELVDDL, the fifth transistor T5, the first transistor T1, the sixth transistor T6, the light emitting element LD, and the second power line ELVSSL may be formed.

A driving current amount flowing to the first electrode and the second electrode of the first transistor T1 may be adjusted according to the voltage maintained in the storage capacitor Cst. The light emitting element LD may emit light with a luminance corresponding to the driving current amount. The light emitting element LD may emit light until the emission signal of the turn-off level is applied to the emission line ELi.

In case that the emission signal is the turn-on level, pixels receiving the corresponding emission signal may be in a display state. Therefore, a period in which the emission signal is the turn-on level may be referred to as an emission period EP (or an emission allowable period). In case that the emission signal is the turn-off level, pixels receiving the corresponding emission signal may be in a non-display state. Therefore, a period in which the emission signal is the turn-off level may be referred to as a non-emission period NEP (or an emission disallowable period).

The non-emission period NEP described with reference to FIG. 4 may be for preventing the pixel PXij from emitting light with an undesired luminance during the initialization period and the data writing period.

One or more non-emission periods NEP may be additionally provided while data written to the pixel PXij is maintained (for example, one frame period). This may be for effectively expressing a low grayscale by reducing the emission period EP of the pixel PXij, or for smoothly blurring a motion of an image.

Figure 5:
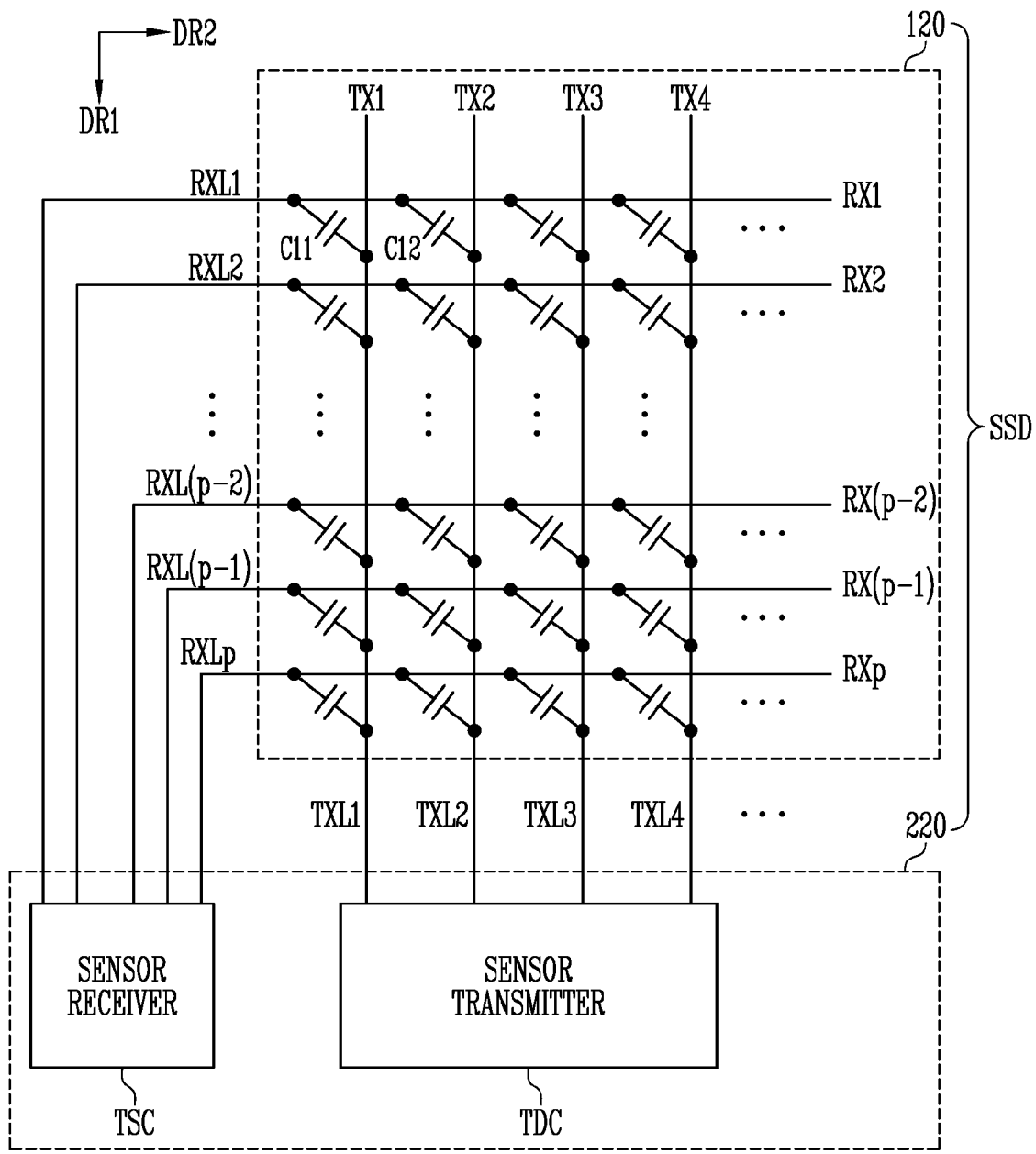
FIG. 5 is a schematic diagram illustrating a sensor device according to an embodiment of the disclosure.

FIG. 5 is a schematic diagram illustrating a sensor device according to an embodiment of the disclosure.

Referring to FIG. 5, the sensor device SSD according to an embodiment of the disclosure may include the sensor part 120 and the sensor driver 220. The sensor device SSD may be included in the display device 1.

The sensor part 120 may include first sensors TX1, TX2, TX3, TX4, ... and second sensors RX1, RX2, ..., RX(p−2), RX(p−1), and RXp. p may be an integer greater than 0. For example, the first sensors may include a first-first sensor TX1, a second-first sensor TX2, a third-first sensor TX3, and a fourth-first sensor TX4. The first sensors TX1 to TX4 may extend in the first direction DR1 and may be arranged in the second direction DR2. The second sensors RX1 to RXp may extend in the second direction DR2 and may be arranged in the first direction DR1. The second sensors RX1 to RXp may cross the first sensors TX1 to TX4. The first sensors TX1 to TX4 and the second sensors RX1 to RXp may form a mutual capacitance. For example, a capacitance C11 may be formed between the first sensor TX1 and the second sensor RX1, and a capacitance C12 may be formed between the first sensor TX2 and the second sensor RX1. The sensor driver 220 may sense a change of the capacitances C11 and C12 and determine whether or not a touch of a user is input.

The sensor driver 220 may include a sensor transmitter TDC and a sensor receiver TSC. The sensor transmitter TDC may be connected to the first sensors TX1 to TX4 and supply driving signals to the first sensors TX1 to TX4. The sensor transmitter TDC may be connected to the first sensors TX1 to TX4 through first sensor lines TXL1, TXL2, TXL3, and TXL4.

The sensor receiver TSC may be connected to the second sensors RX1 to RXp and receive sensing signals from the second sensors RX1 to RXp. The sensor receiver TSC may be connected to the second sensors RX1 to RXp through second sensor lines RXL1, RXL2, ..., RXL(p−2), RXL(p−1), and RXLp.

Figure 6:
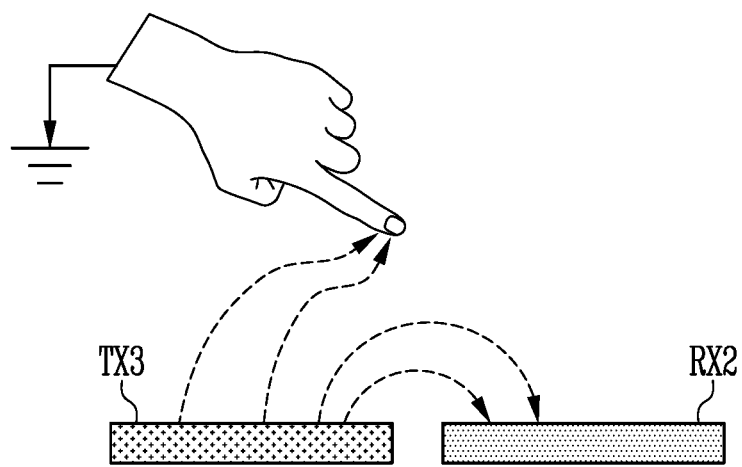
FIG. 6 is a schematic diagram illustrating a method of driving the sensor device of FIG. 5.
Figure 6:
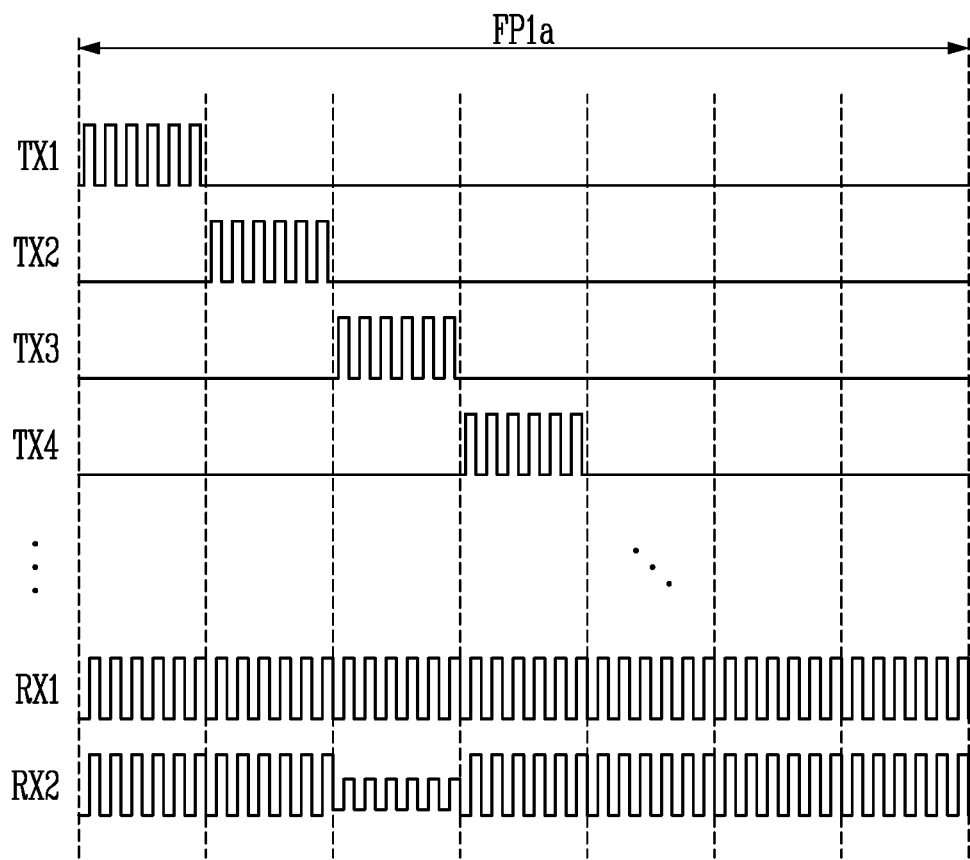

FIG. 6 is a schematic diagram illustrating a method of driving the sensor device of FIG. 5.

For convenience of description, only a signal waveform for some sensors TX1, TX2, TX3, TX4, RX1, and RX2 of the sensor part 120 during a first frame period FP1a is shown in FIG. 6.

During the first frame period FP1a, driving signals alternating a high level and a low level may be sequentially applied to the first sensors TX1, TX2, TX3, and TX4. For example, the sensor driver 220 may apply the driving signal alternating the high level and the low level to the first-first sensor TX1, and may not apply the driving signal to other first sensors TX2, TX3, and TX4. Next, the sensor driver 220 may apply the driving signal alternating the high level and the low level to the second-first sensor TX2, and may not apply the driving signal to other first sensors TX1, TX3, and TX4. Next, the sensor driver 220 may apply the driving signal alternating the high level and the low level to the third-first sensor TX3, and may not apply the driving signal to other first sensors TX1, TX2, and TX4. Next, the sensor driver 220 may apply the driving signal alternating the high level and the low level to the fourth-first sensor TX4, and may not apply the driving signal to other first sensors TX1, TX2, TX3.

The user may touch an intersection of the third-first sensor TX3 and the second sensor RX2 with a finger. A mutual capacitance between the third-first sensor TX3 and the second sensor RX2 may be decreased, and thus a magnitude of a sensing signal received from the second sensor RX2 in case that the driving signal is applied to the third-first sensor TX3 may be decreased. Therefore, a portion of the display device 1 where the user touches may be checked.

Figure 7:
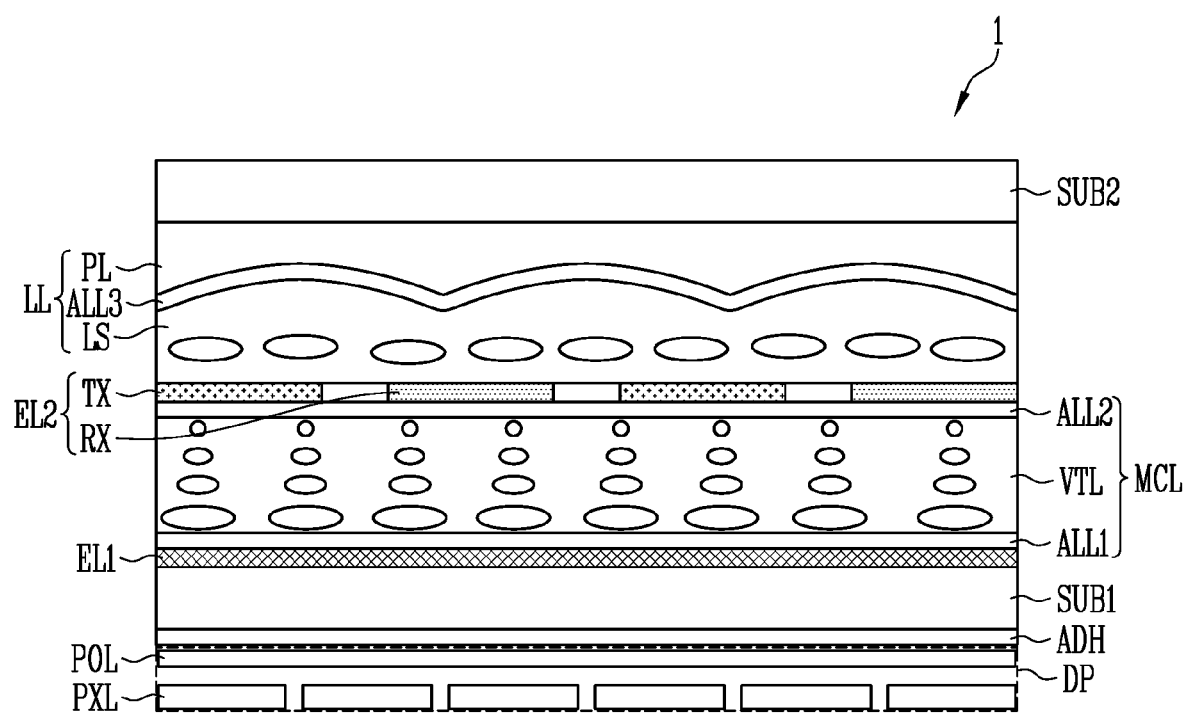
Figure 8A:
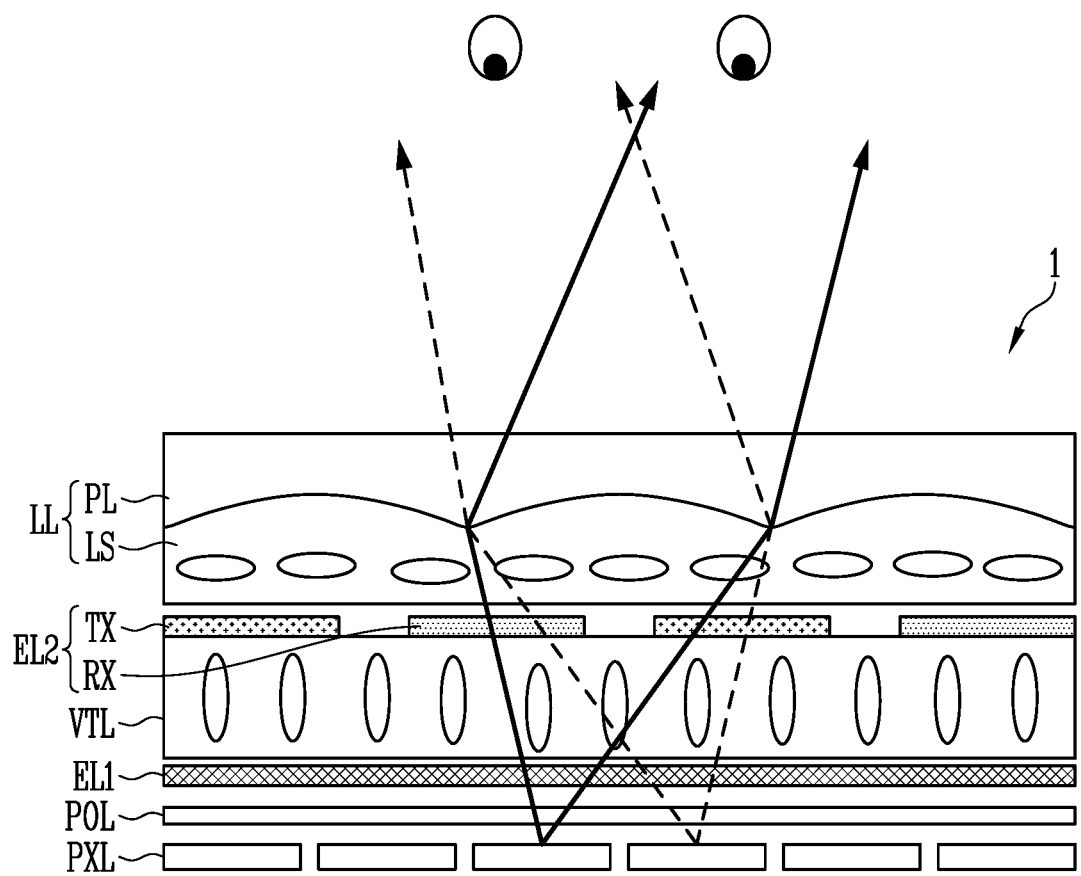

FIGS. 7, 8A, and 8B are schematic diagrams illustrating a display device capable of switching between a 3D mode and a 2D mode according to an embodiment of the disclosure.

Referring to FIG. 7, the display device 1 according to an embodiment of the disclosure may include a display panel DP, an adhesive layer ADH, a first substrate SUB1, a first electrode layer EL1, a mode conversion layer MCL, a second electrode layer EL2, a lens layer LL, and a second substrate SUB2.

The display panel DP may include an organic light emitting display panel, a liquid crystal display panel, a quantum dot display panel, or the like. For example, the display panel DP may include a pixel layer PXL and a polarization layer POL.

The pixel layer PXL may include multiple pixels. A structure and driving method of the pixels may be same as the description of FIGS. 1 to 3.

The polarization layer POL may be positioned on the pixel layer PXL. The polarization layer POL may serve as an anti-reflection layer. For example, the polarization layer POL may reduce reflectance of external light incident from an outside of the display device 1. According to an embodiment, the polarization layer POL may include a phase retarder or a polarizer. The phase retarder may be a film type or a liquid crystal coating type, and may include a ½ wavelength phase retarder or a ¼ wavelength phase retarder. The polarizer may be a film type or a liquid crystal coating type.

According to an embodiment, the polarization layer POL may not be configured of a polarizing film or a polarizing plate, and may be functionally configured using at least another element included in the display panel DP. For example, a function of the polarization layer POL may be implemented using a color filter, a black matrix, or the like included in the display panel DP.

The adhesive layer ADH may be positioned on the display panel DP. The adhesive layer ADH may bond the display panel DP and the first substrate SUB1 to each other. The adhesive layer ADH may be a transparent adhesive layer, and for example, may be configured of an optically clear adhesive film (OCA) or an optically clear resin (OCR).

The first substrate SUB1 may be positioned on the adhesive layer ADH. The first substrate SUB1 may be formed of a transparent insulating material. For example, the first substrate SUB1 may include an organic material selected from the group consisting of polyethersulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (SAC), and cellulose acetate propionate (CAP).

In an embodiment, the first substrate SUB1 may be an inorganic material. For example, the first substrate SUB1 may include a silicon nitride layer, a silicon oxynitride layer, a silicon oxide layer, a titanium oxide layer, or an aluminum oxide layer.

The first electrode layer EL1 may be positioned on the first substrate SUB1. The first electrode layer EL1 may have conductivity by including at least one of a metal, a transparent conductive material, and various other conductive materials. For example, the first electrode layer EL1 may include a metal such as gold (Au), silver (Ag), aluminum (Al), molybdenum (Mo), chromium (Cr), titanium (Ti), nickel (Ni), neodymium (Nd), copper (Cu), and platinum (Pt), or an alloy thereof. The first electrode layer EL1 may be configured in a silver mesh shape. The first sensors TX and the second sensors RX may include at least one transparent conductive material such as silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide (SnO2), carbon nanotubes, graphene, and the like. The first electrode layer EL1 may have conductivity by including at least one conductive material. The first electrode layer EL1 may be formed of a single layer or multiple layers, and a cross-sectional structure thereof is not particularly limited.

The mode conversion layer MCL may be disposed on the first electrode layer EL1. The mode conversion layer MCL may control whether the display device 1 is driven in the 3D mode or the 2D mode. For example, the mode conversion layer MCL may include a first alignment layer ALL1, a liquid crystal layer VTL, and a second alignment layer ALL2.

The first alignment layer ALL1 may be disposed on the first electrode layer EL1. For example, the first alignment layer ALL1 may include polyimide. The first alignment layer ALL1 may be rubbed according to a desired liquid crystal driving mode. In case that the first alignment layer ALL1 can be applied to a desired position using an inkjet method, a rubbing treatment for the first alignment layer ALL1 may be unnecessary.

The liquid crystal layer VTL may be disposed on the first alignment layer ALL1. The liquid crystal layer VTL may be configured in a twisted nematic (TN) mode having a λ/2 phase difference. However, the disclosure is not limited thereto, and the liquid crystal layer VTL may be configured in a liquid crystal mode such as vertical alignment (VA), optical compensated bend (OCB), or electrically controlled birefringence (ECB).

The second alignment layer ALL2 may be disposed on the liquid crystal layer VTL. For example, the second alignment layer ALL2 may include polyimide. The second alignment layer ALL2 may be rubbed according to a desired liquid crystal driving mode. In case that the second alignment layer ALL2 can be applied to a desired position using an inkjet method, a rubbing treatment for the second alignment layer ALL2 may be unnecessary.

The second electrode layer EL2 may be disposed on the mode conversion layer MCL. The second electrode layer EL2 may include the first sensors TX and the second sensors RX forming a capacitance with the first sensors TX. A structure and a driving method of the first sensors TX and the second sensors RX may be same as the description of FIGS. 1, 5, and 6.

The lens layer LL may be positioned on the second electrode layer EL2. The lens layer LL may be implemented in various structures. For example, the lens layer LL may be implemented as a lenticular lens array, a micro lens array, or the like. For example, the lens layer LL may include lenses LS, a third alignment layer ALL3, and an outer layer PL.

The lenses LS may include an optically anisotropic material. For example, an inside of the lenses LS may be formed of a reactive mesogen. For example, since the lenses LS have a mesogenic structure, the lenses LS may form a liquid crystal phase. A material filling the lenses LS may be formed to have a liquid crystal phase by being cured in response to light such as ultraviolet rays. Accordingly, the inside of the lenses LS may have an optically anisotropic fixed phase. For example, the lenses LS may have different major-axis refractive indices and minor-axis refractive indices.

The third alignment layer ALL3 may be positioned on the lenses LS. For example, the third alignment layer ALL3 may include polyimide. The third alignment layer ALL3 may be rubbed according to a desired liquid crystal driving mode. In case that the third alignment layer ALL3 can be applied to a desired position using an inkjet method, a rubbing treatment for the third alignment layer ALL3 may be unnecessary.

The outer layer PL may be disposed to cover the third alignment layer ALL3. The outer layer PL may have a flat upper surface. The outer layer PL may be formed of an optically isotropic polymer. For example, the outer layer PL may include an optically isotropic material having a refractive index substantially equal to the major-axis refractive index or the minor-axis refractive index of the lenses LS. For example, the isotropic polymer may include at least one selected from the group consisting of an acrylic resin, a polycarbonate, and a cycloolefin polymer (COP).

The second substrate SUB2 may be positioned on the lens layer LL. The second substrate SUB2 may be formed of a transparent insulating material. For example, the second substrate SUB2 may include an organic material selected from the group consisting of polyethersulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (SAC), and cellulose acetate propionate (CAP).

In an embodiment, the second substrate SUB2 may include an inorganic material. For example, the second substrate SUB2 may include a silicon nitride layer, a silicon oxynitride layer, a silicon oxide layer, a titanium oxide layer, or an aluminum oxide layer.

A case in which the display device 1 is driven in the 3D mode is described with reference to FIG. 8A. First, light emitted from the pixel layer PXL may pass through the polarization layer POL and become input polarized light. An electric field may be formed between the first electrode layer EL1 and the first sensors TX, and thus liquid crystal molecules of the liquid crystal layer VTL may be arranged along the electric field direction. Therefore, the input polarized light may pass through the liquid crystal layer VTL as it is and may be incident on the lens layer LL. An arrangement direction of the liquid crystal molecules of the lenses LS may coincide with a direction of the input polarized light, and thus a refractive index may be maximized by a maximum retardation effect. Therefore, a refractive index difference may occur at an interface between the lenses LS and the outer layer PL, and thus light may be refracted. Therefore, the lens layer LL may function as a lens for a 3D image. Accordingly, the 3D image may be displayed.

A case in which the display device 1 is driven in the 2D mode is described with reference to FIG. 8B. First, light emitted from the pixel layer PXL may pass through the polarization layer POL and become input polarized light. An electric field may not be formed between the first electrode layer EL1 and the first sensors TX, and thus the liquid crystal molecules of the liquid crystal layer VTL may be arranged so that an arrangement direction of a lower side and an upper side are different by 90 degrees. Therefore, the input polarized light may be incident on the lens layer LL in a state in which a polarization direction is rotated by 90 degrees while passing through the liquid crystal layer VTL. The arrangement direction of the liquid crystal molecules of the lenses LS may become orthogonal to a direction of the input polarized light, and thus a refractive index may be minimized. Therefore, a refractive index difference at an interface between the lenses LS and the outer layer PL may be minimized, and thus light may not be refracted. Therefore, the lens layer LL does not function as a lens for a 3D image. Accordingly, a 2D image may be displayed.

Figure 9:
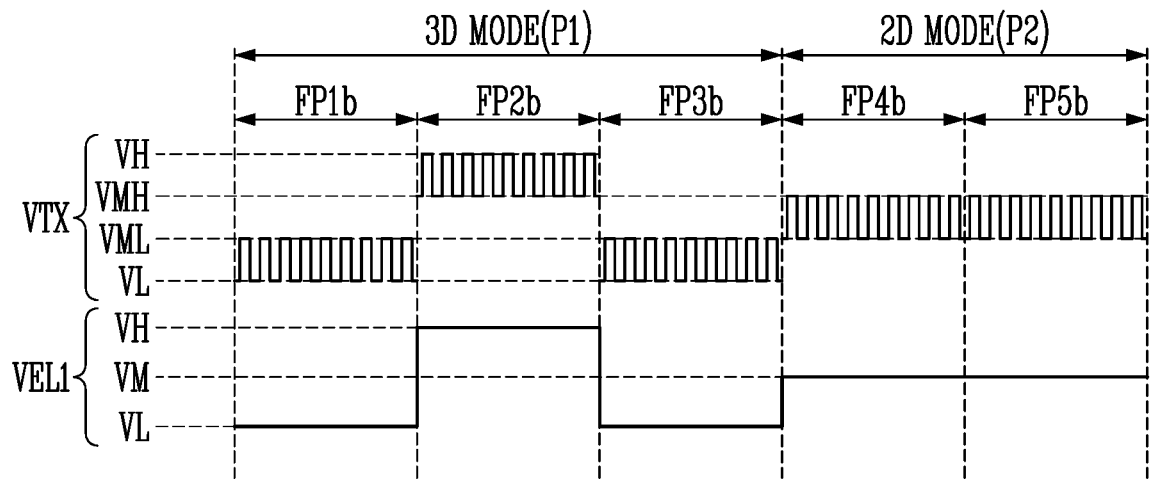
FIGS. 9 and 10 are schematic diagrams illustrating a method of driving the display device of FIG. 7.
Figure 10:
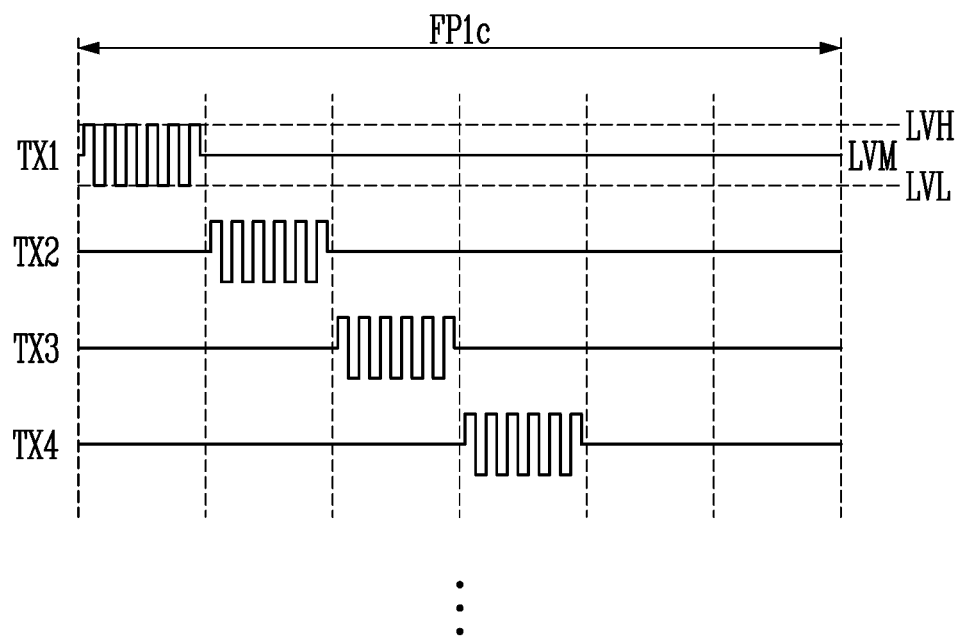

FIGS. 9 and 10 are schematic diagrams illustrating a method of driving the display device of FIG. 7.

Referring to FIG. 9, a first period P1 in which the display device 1 is driven in the 3D mode and a second period P2 in which the display device 1 is driven in the 2D mode are shown. Switching between the 3D mode and the 2D mode of the display device 1 may be performed manually by a manipulation of the user or may be performed automatically by an application.

The first period P1 may include a first frame period FP1b and a second frame period FP2b after the first frame period FP1b. The first period P1 may further include a third frame period FP3b after the second frame period FP2b.

A first voltage level VL of a first voltage VEL1 applied to the first electrode layer EL1 during the first frame period FP1b may be less than a second voltage level VH of the first voltage VEL1 applied to the first electrode layer EL1 during the second frame period FP2b.

A first average voltage level of driving signals VTX applied to the first sensors TX during the first frame period FP1b may be less than a second average voltage level of the driving signals VTX applied to the first sensors TX during the second frame period FP2b.

The first voltage VEL1 of the first voltage level VL may be applied to the first electrode layer EL1 during the third frame period FP3b, and the driving signals VTX of the first average voltage level may be applied to the first sensors TX during the third frame period FP3b.

An average voltage level of a specific signal may be an average value of voltage levels during a specific period of the specific signal. The first average voltage level may be a value between a voltage level upper limit VML and a voltage level lower limit VL (or the first voltage level VL) of the driving signals VTX in the first frame period FP1b. For example, the first average voltage level may be an average value of the voltage level upper limit VML and the voltage level lower limit VL of the driving signals VTX in the first frame period FP1b. The second average voltage level may be a value between the voltage level upper limit VH (or the second voltage level VH) and the voltage level lower limit VMH of the driving signals VTX in the second frame period FP2b. For example, the second average voltage level may be an average value of the voltage level upper limit VH and the voltage level lower limit VMH of the driving signals VTX in the second frame period FP2b.

Therefore, the first average voltage level may be greater than the first voltage level VL, and the second average voltage level may be less than the second voltage level VH. Accordingly, an electric field of different directions may be alternately applied to the liquid crystal layer VTL in a unit frame. in case that an electric field of the same direction is continuously applied to the liquid crystal layer VTL, an ion may be accumulated in a specific area of the liquid crystal layer VTL, and thus an electric field of an opposite direction may be generated. According to the embodiment, the accumulation of the ion may be prevented by alternately applying the electric field of the different directions to the liquid crystal layer VTL in a unit frame.

According to the embodiment, in case that the first voltage VEL1 applied to the first electrode layer EL1 increases, the average voltage level of the driving signals VTX applied to the first sensors TX may increase (for example, switching from the first frame period FP1b to the second frame period FP2b). In case that the first voltage VEL1 applied to the first electrode layer EL1 decreases, the average voltage level of the driving signals VTX applied to the first sensors TX may decrease (for example, switching from the second frame period FP2b to the third frame period FP3b). Accordingly, noise due to a voltage level change of the first voltage VEL1 may be minimized from affecting the driving signals VTX.

The second period P2 may include a fourth frame period FP4b and a fifth frame period FP5b after the fourth frame period FP4b.

A first voltage VEL1 of a third voltage level VM may be applied to the first electrode layer EL1 during the fourth frame period FP4b and the fifth frame period FP5b. The third voltage level VM may be between the first voltage level VL and the second voltage level VH. For example, the third voltage level VM may be an average value or a median value of the first voltage level VL and the second voltage level VH.

Driving signals VTX of a third average voltage level may be applied to the first sensors TX during the fourth frame period FP4b and the fifth frame period FP5b. The third average voltage level may be a value between the first average voltage level and the second average voltage level. The third voltage level VM and the third average voltage level may be the same. Therefore, an electric field may not be generated between the first electrode layer EL1 and the second electrode layer EL2 in the 2D mode.

In an embodiment, the upper limit VMH of the driving signals VTX applied to the first sensors TX during the fourth frame period FP4b and the fifth frame period FP5b and the lower limit VMH of the driving signals VTX applied to the first sensors TX during the second frame period FP2b may be the same.

In an embodiment, the lower limit VML of the driving signals VTX applied to the first sensors TX during the fourth frame period FP4b and the fifth frame period FP5b and the upper limit VML of the driving signals VTX applied to the first sensors TX during the first frame period FP1b may be the same.

Referring to FIG. 10, a voltage level of driving signals according to an embodiment of the disclosure is shown. In FIG. 10, driving signals applied to the first sensors TX1, TX2, TX3, and TX4 in a first frame period FP1c are shown.

The driving signals alternating the high level LVH and the low level LVL may be sequentially applied to the first sensors TX1, TX2, TX3, and TX4 during the first frame period FP1c. A voltage of a middle level LVM between the high level LVH and the low level LVL may be applied to the first sensors TX1, TX2, TX3, and TX4 to which the driving signals are not applied.

For example, the sensor driver 220 may apply the driving signal alternating the high level LVH and the low level LVL to the first-first sensor TX1, and may apply the voltage of the middle level LVM to other first sensors TX2, TX3, and TX4. Next, the sensor driver 220 may apply the driving signal alternating the high level LVH and the low level LVL to the second-first sensor TX2, and may apply the voltage of the middle level LVM to other first sensors TX1, TX3, and TX4. Next, the sensor driver 220 may apply the driving signal alternating the high level LVH and the low level LVL to the third-first sensor TX3, and may apply the voltage of the middle level LVM to other first sensors TX1, TX2, and TX4. Next, the sensor driver 220 may apply the driving signal alternating the high level LVH and the low level LVL to the fourth-first sensor TX4, and may apply the voltage of the middle level LVM to other first sensors TX1, TX2, and TX3.

According to the embodiment, the first sensors TX may function as a common electrode with respect to the liquid crystal layer VTL, and may stably form an electric field between the first electrode layer EL and the first sensors TX in the 3D mode. Generation of the electric field between the first electrode layer EL1 and the first sensors TX may be stably prevented in the 2D mode.

Figure 11:
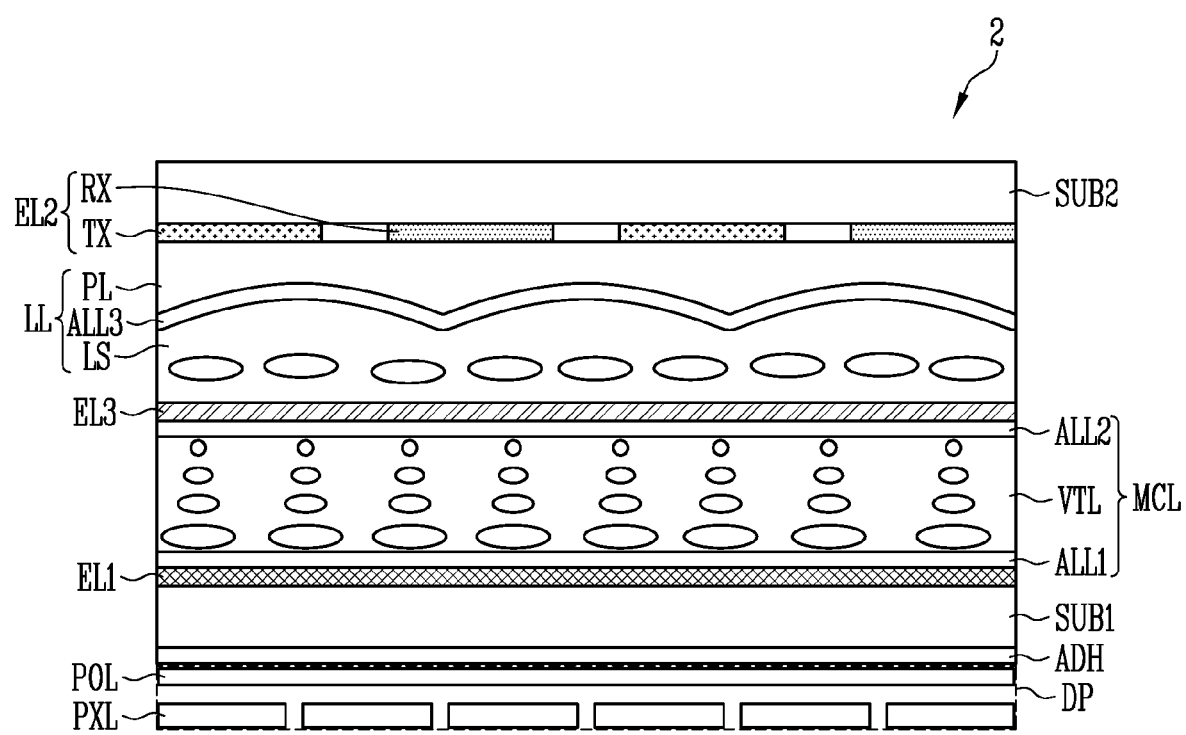
FIGS. 11, 12A, and 12B are schematic diagrams illustrating a display device capable of switching between a 3D mode and a 2D mode according to another embodiment of the disclosure.
Figure 12A:
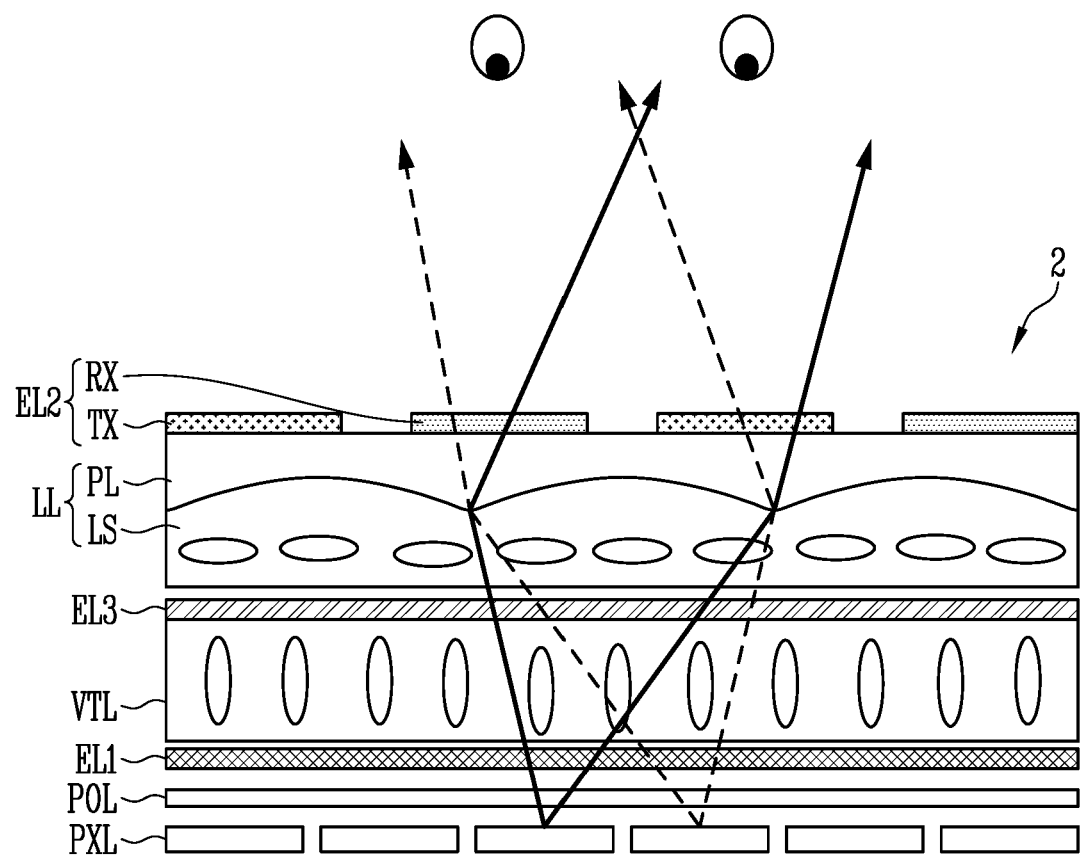
Figure 12B:
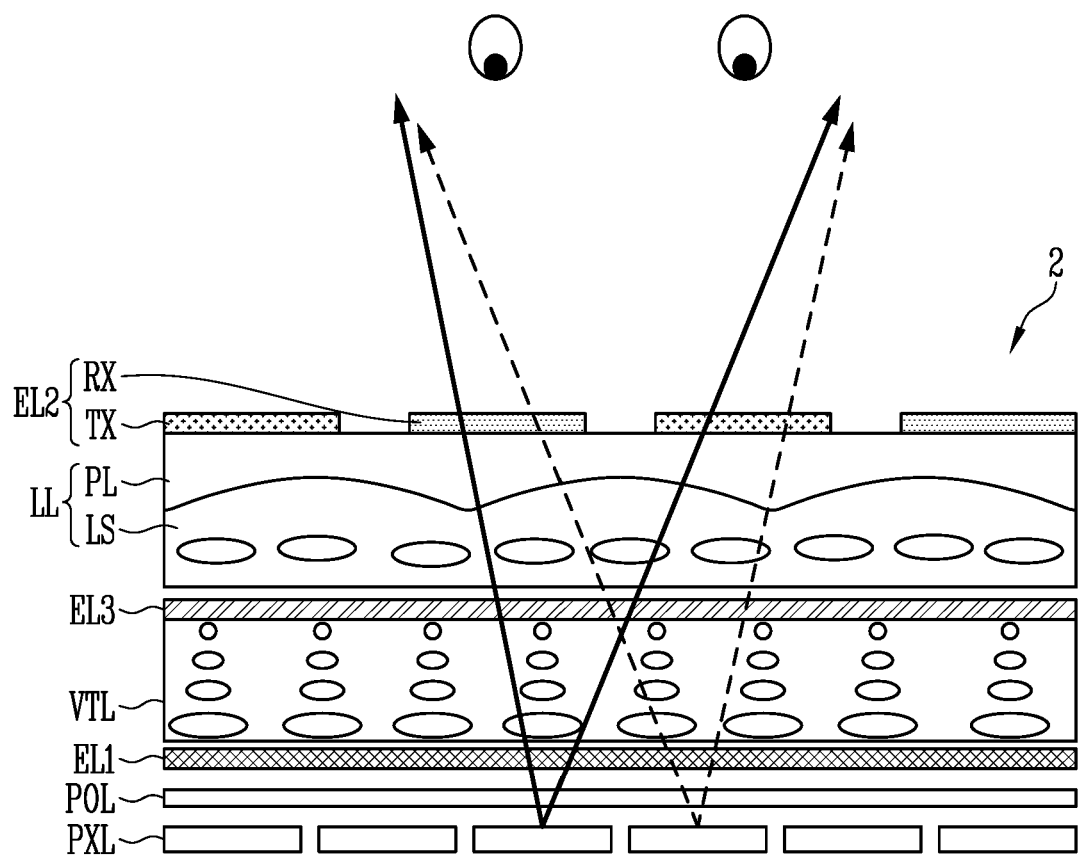

FIGS. 11, 12A, and 12B are schematic diagrams illustrating a display device capable of switching between a 3D mode and a 2D mode according to another embodiment of the disclosure.

The display device 2 of FIG. 11 may include a third electrode layer EL3 positioned on the mode conversion layer MCL. The second electrode layer EL2 may be positioned on the lens layer LL. Other configurations other than these are same as those of the display device 1 of FIG. 7, and thus an overlapping description is omitted.

Since a description of FIG. 12A is substantially the same as that of FIG. 8A and a description of FIG. 12B is substantially the same as that of FIG. 8B, only the third electrode layer EL3, which is a difference, is additionally described. The driving signals VTX of FIG. 9 may be identically applied to the third electrode layer EL3. Therefore, the third electrode layer EL3 may form/release an electric field according to the 3D/2D mode with the first electrode layer EL1 without interfering with the driving signals VTX applied to the first sensors TX.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments.

What is claimed is:

1. A display device comprising:
   a display panel;
   a first electrode layer disposed on the display panel;
   a liquid crystal layer disposed on the first electrode layer;
   a second electrode layer disposed on the liquid crystal layer; and
   a lens layer disposed on the second electrode layer, wherein
   the second electrode layer includes first sensors and second sensors forming a capacitance with the first sensors,
   a first period includes a first frame period and a second frame period after the first frame period,
   a first voltage level of a first voltage maintained at the first electrode layer during the first frame period is less than a second voltage level of the first voltage maintained at the first electrode layer during the second frame period, and
   a first average voltage level of driving signals applied to the first sensors during the first frame period is less than a second average voltage level of the driving signals applied to the first sensors during the second frame period.

2. The display device according to claim 1, wherein
   the first period further includes a third frame period after the second frame period,
   the first voltage having the first voltage level is applied to the first electrode layer during the third frame period, and
   the driving signals having the first average voltage level are applied to the first sensors during the third frame period.

3. The display device according to claim 2, wherein
a second period after the first period includes a fourth frame period and a fifth frame period after the fourth frame period,
the first voltage having a third voltage level is applied to the first electrode layer during the fourth frame period and the fifth frame period, and
the driving signals having a third average voltage level are applied to the first sensors during the fourth frame period and the fifth frame period.

4. The display device according to claim 3, wherein the third voltage level is between the first voltage level and the second voltage level.

5. The display device according to claim 3, wherein the third average voltage level is between the first average voltage level and the second average voltage level.

6. The display device according to claim 3, wherein the third voltage level and the third average voltage level are same.

7. The display device according to claim 3, wherein an upper limit of the driving signals applied to the first sensors during the fourth frame period and the fifth frame period and a lower limit of the driving signals applied to the first sensors during the second frame period are same.

8. The display device according to claim 7, wherein a lower limit of the driving signals applied to the first sensors during the fourth frame period and the fifth frame period and an upper limit of the driving signals applied to the first sensors during the first frame period are same.

9. The display device according to claim 1, wherein
the first average voltage level is greater than the first voltage level, and
the second average voltage level is less than the second voltage level.

10. The display device according to claim 1, wherein during the first frame period,
the driving signals alternating a high level and a low level are sequentially applied to the first sensors, and
a middle level of voltage between the high level and the low level is applied to the first sensors to which the driving signals are not applied.

11. A method of driving a display device including a display panel, a first electrode layer disposed on the display panel, a liquid crystal layer disposed on the first electrode layer, a second electrode layer disposed on the liquid crystal layer, a lens layer disposed on the second electrode layer, wherein the second electrode layer includes first sensors and second sensors forming a capacitance with the first sensors, the method comprising:
applying a first voltage maintaining a first voltage level to the first electrode layer during a first frame period;
applying driving signals having a first average voltage level to the first sensors during the first frame period;
applying the first voltage maintaining a second voltage level greater than the first voltage level to the first electrode layer during a second frame period after the first frame period; and
applying the driving signals having a second average voltage level greater than the first average voltage level to the first sensors during the second frame period.

12. The method according to claim 11, further comprising:
applying the first voltage having the first voltage level to the first electrode layer during a third frame period after the second frame period; and
applying the driving signals having the first average voltage level to the first sensors during the third frame period.

13. The method according to claim 12, further comprising:
applying the first voltage having a third voltage level to the first electrode layer during a fourth frame period after the third frame period and a fifth frame period after the fourth frame period; and
applying the driving signals having a third average voltage level to the first sensors during the fourth frame period and the fifth frame period.

14. The method according to claim 13, wherein the third voltage level is between the first voltage level and the second voltage level.

15. The method according to claim 13, wherein the third average voltage level is between the first average voltage level and the second average voltage level.

16. The method according to claim 13, wherein the third voltage level and the third average voltage level are same.

17. The method according to claim 13, wherein an upper limit of the driving signals applied to the first sensors during the fourth frame period and the fifth frame period and a lower limit of the driving signals applied to the first sensors during the second frame period are same.

18. The method according to claim 17, wherein a lower limit of the driving signals applied to the first sensors during the fourth frame period and the fifth frame period and an upper limit of the driving signals applied to the first sensors during the first frame period are same.

19. The method according to claim 11, wherein
the first average voltage level is greater than the first voltage level, and
the second average voltage level is less than the second voltage level.

20. An electronic device comprising:
a processor providing grayscales;
a display panel receiving the grayscales and displaying an image based on the grayscales;
a first electrode layer disposed on the display panel;
a liquid crystal layer disposed on the first electrode layer;
a second electrode layer disposed on the liquid crystal layer; and
a lens layer disposed on the second electrode layer, wherein
the second electrode layer includes first sensors and second sensors forming a capacitance with the first sensors,
a first period includes a first frame period and a second frame period after the first frame period,
a first voltage level of a first voltage maintained at the first electrode layer during the first frame period is less than a second voltage level of the first voltage maintained at the first electrode layer during the second frame period, and
a first average voltage level of driving signals applied to the first sensors during the first frame period is less than a second average voltage level of the driving signals applied to the first sensors during the second frame period.

* * * * *